(12) United States Patent
Moore et al.

(10) Patent No.: US 11,143,078 B2
(45) Date of Patent: Oct. 12, 2021

(54) AFTERTREATMENT SYSTEM AND METHOD

(71) Applicant: Caterpillar Inc., Peoria, IL (US)

(72) Inventors: Paul R. Moore, Dunlap, IL (US); Ling Deng, San Antonio, TX (US); Wilce Damion Williams, San Antonio, TX (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/717,409

(22) Filed: Dec. 17, 2019

(65) Prior Publication Data

US 2021/0180494 A1 Jun. 17, 2021

(51) Int. Cl.
| | |
|---|---|
| *F01N 3/20* | (2006.01) |
| *F01N 13/00* | (2010.01) |
| *F01N 3/035* | (2006.01) |
| *F01N 3/10* | (2006.01) |

(52) U.S. Cl.
CPC ........... *F01N 3/208* (2013.01); *F01N 13/009* (2014.06); *B01D 2258/012* (2013.01); *F01N 3/035* (2013.01); *F01N 3/103* (2013.01); *F01N 2560/026* (2013.01); *F01N 2570/14* (2013.01); *F01N 2610/02* (2013.01); *F01N 2610/03* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,428,810 | B2 * | 9/2008 | Driscoll | F02D 19/081 60/286 |
| 8,151,779 | B1 * | 4/2012 | Hagiwara | F02D 19/0692 123/575 |
| 8,656,703 | B2 | 2/2014 | Nakamura | |
| 9,181,835 | B2 | 11/2015 | Aliyev | |
| 9,879,581 | B2 | 1/2018 | Rodman et al. | |
| 2009/0035195 | A1 * | 2/2009 | Robel | F01N 13/011 422/177 |
| 2011/0259290 | A1 * | 10/2011 | Michikawauchi | F02D 19/0692 123/1 A |

(Continued)

FOREIGN PATENT DOCUMENTS

| | | |
|---|---|---|
| EP | 0891473 B1 | 3/2002 |
| FR | 2780098 B1 | 9/2005 |

(Continued)

*Primary Examiner* — Binh Q Tran
(74) *Attorney, Agent, or Firm* — Leydig, Voit & Mayer, LTD.

(57) ABSTRACT

A system for the treatment of exhaust gases from an internal combustion engine with a combustion chamber includes an upstream DEF injector disposed to introduce DEF to the combustion chamber and a close-coupled SCR catalyst downstream of and in close-coupled relation to the internal combustion engine. Downstream of the close-coupled SCR catalyst may be a primary SCR catalyst and a primary DEF injector. The system may operate to reduce $NO_2$ in the close-coupled SCR catalyst during low-load conditions of the internal combustion engine and reduce $NO_2$ in the primary SCR catalyst during loaded conditions.

19 Claims, 4 Drawing Sheets

(56) References Cited

U.S. PATENT DOCUMENTS

| | | | | |
|---|---|---|---|---|
| 2011/0265455 A1* | 11/2011 | Hirota | ............... | F02D 19/0644 |
| | | | | 60/285 |
| 2011/0283684 A1* | 11/2011 | Aso | ............... | F02D 19/0671 |
| | | | | 60/285 |
| 2017/0298850 A1* | 10/2017 | Kurtz | ............... | F02D 19/0607 |

FOREIGN PATENT DOCUMENTS

| | | | |
|---|---|---|---|
| FR | 2965854 B1 | 3/2013 | |
| JP | 2006-29147 A | 2/2006 | |

\* cited by examiner

AFTERTREATMENT SYSTEM AND METHOD

TECHNICAL FIELD

This patent disclosure relates generally to an exhaust aftertreatment system for treating exhaust gases from an internal combustion engine and, more particularly, to a system and method of utilizing selective catalytic reduction.

BACKGROUND

Various systems and methods have been developed to reduce certain emissions and byproducts in the exhaust gases discharged from internal combustion engines, some of which have been directly developed in response to government-mandated regulations over such emissions. These systems may work in in situ with the combustion process, such as fuel additives and the like. Other systems may be disposed downstream in the exhaust system to interact with the exhaust gases and are be referred as aftertreatment systems. One example of an aftertreatment system is a chemical process referred to as selective catalytic reduction (SCR) in which a catalyst with a flow-through substrate made from or coated with a base metal such as vanadium is located in the exhaust conduit to receive the hot exhaust gases discharged from the internal combustion engine. A liquid reductant agent, often called diesel exhaust fluid (DEF), is introduced to the exhaust system and can intermix with the exhaust gases or can be absorbed on the catalyst. Common reductant agents include pure anhydrous ammonia or an aqueous ammonia solution of pure ammonia mixed with water. Nitrogen oxides such as NO and $NO_2$, sometimes referred to as $NO_X$, react with the DEF in the presence of the catalyst such that $NO_X$ is converted to nitrogen ($N_2$) and water ($H_2O$).

In instances where the internal combustion engine is of a significant size, e.g., in the magnitude of several hundred horsepower or kilowatts, the SCR catalyst may be operatively associated with other aftertreatment systems intended to interact with different emissions and byproducts in the exhaust gases. One example of another aftertreatment system is a filtration system like a diesel particulate filter (DPF) that filters and removes elements from the exhaust gases such as particulate matter and soot that may occur due to, for example, incomplete combustion of fuel. Because the filter physically traps and accumulates particulate matter, it will eventually start to impede exhaust flow, and therefore typically requires periodic cleaning, which may be accomplished by a process referred to as "filter regeneration." Another example of an aftertreatment system is a diesel oxidation catalyst (DOC) in which a catalyst made from palladium, platinum or other noble metals catalytically oxidizes with carbon monoxide (CO) and hydrocarbons ($C_xH_x$) in the exhaust gases to form carbon dioxide ($CO_2$) and water ($H_2O$).

U.S. Pat. No. 8,656,703 (the '703 patent) describes an exhaust purification system for an internal combustion engine in which multiple aftertreatment systems and technologies including an SCR catalyst, a diesel oxidation catalyst, and a diesel particulate filter are housed in first and second catalytic converters and organized in series in the exhaust passage. The '703 patent also describes a technique in which the DEF may be introduced to the combustion chambers of the engine so that it will be partially retrained in the resulting exhaust gases directed to the catalytic converters in the exhaust passage. The present disclosure is also directed to novel arrangements and methods for introducing DEF to the exhaust gases for reaction in the aftertreatment system of an internal combustion engine.

SUMMARY

The disclosure describes, in an aspect, a machine with an internal combustion engine including at least one combustion chamber. The internal combustion engine is operatively associated with an air intake system upstream to direct intake air to the combustion chamber and an exhaust system to direct exhaust gases from the combustion chamber. The machine includes an upstream diesel exhaust fluid (DEF) injector to selectively introduce DEF to the combustion chamber. Downstream of the internal combustion engine in the exhaust system is a close-coupled selective catalytic reduction (SCR) catalyst that receives raw exhaust gases and reduces nitrogen oxides ($NO_X$) to nitrogen ($N_2$) and water ($H_2O$) during a low-load condition.

In another aspect, the disclosure describes a method of treating exhaust gases from an internal combustion engine. According to the method, during a low-load condition of the internal combustion engine, diesel exhaust fluid (DEF) is introduced by an upstream DEF injector to a combustion chamber of the internal combustion engine and raw exhaust gases including the DEF are directed from the combustion chamber to a close-coupled selective catalyst reduction (SCR) catalyst to reduce nitrogen oxides ($NO_X$) to nitrogen ($N_2$) and water ($H_2O$). Also according to the method, exhaust gases are directed from the close-coupled SCR catalyst to a primary aftertreatment system that includes a primary DEF injector and a primary SCR catalyst. In the event of loaded condition of the internal combustion engine, the primary DEF injector introduces DEF to the primary SCR catalyst to reduce $NO_X$ to $N_2$ and $H_2O$ during the loaded condition.

In yet another aspect, the disclosure describes a system for controlling selective catalytic reduction of exhaust gases from an internal combustion engine. The system includes an upstream diesel exhaust fluid (DEF) injector upstream of the internal combustion to introduce DEF to a combustion chamber and a close-coupled selective catalytic reduction (SCR) catalyst downstream of and in a close-coupled relation to the internal combustion engine. The system also includes a primary SCR catalyst downstream of the close-coupled SCR catalyst and a primary DEF injector located to introduce DEF to the primary SCR catalyst. An electronic controller is configured to measure an engine load applied to the internal combustion engine and to assess whether the engine load indicates a low-load condition or a loaded condition. In the event of a low-load condition, the electronic controller activates the upstream DEF injector and in the event of a loaded condition, the electronic controller activates the primary DEF injector.

DETAILED DESCRIPTION

Figure 1:
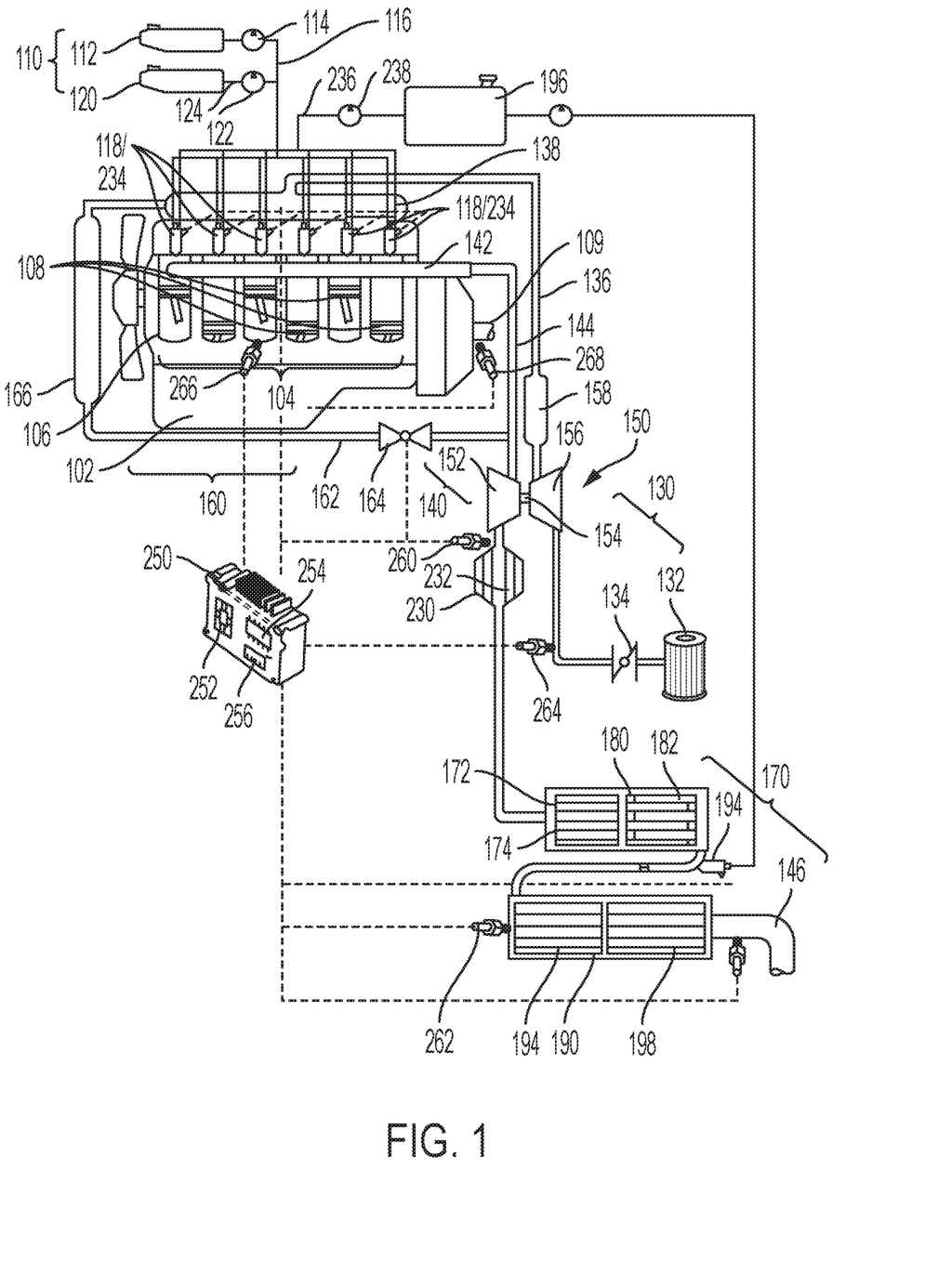
FIG. 1 is a schematic block diagram of an internal combustion engine operatively associated with an aftertreatment system for the treatment of exhaust gases in accordance with the disclosure.

Now referring to the drawings, wherein whenever possible like elements refer to like reference numbers, there is illustrated an internal combustion engine 100 in association with a plurality of engine systems to support operation. The internal combustion engine 100 is configured to combust a mixture of an oxidizer such as air and hydrocarbon-based fuel to convert the chemical energy therein to a motive mechanical power in the form of rotational motion that can be harnessed for other work. The internal combustion engine 100 may be any size, but the present application is particularly suited to large-scale heavy industrial engines on the magnitude of several hundred horsepower or kilowatts. The internal combustion engine 100 may be used to power a variety of industrial machines including mobile machines used in construction, mining, agriculture, and other industries. Such mobile machines may include dozers, excavators, wheel-loaders, dump trucks, tractors, combine harvesters, and the like. Alternatively, the internal combustion engine 100 may be used in stationary applications to power electrical generators, pumps, and the like.

The internal combustion engine 100 can be configured to combustion any suitable hydrocarbon-based fuel and may be a compression ignition diesel engine, a spark-ignited gasoline engine, a hybrid engine, a dual fuel engine burning liquid fuel and natural gas, or the engine may be a fuel-combusting turbine, steam boiler, or other type of combustion engine. However, aspects of the disclosure may be particularly suited to diesel-burning compression ignition engines. The internal combustion engine 100 can include an engine block 102 having a plurality of combusting chambers 104 disposed therein in which the combustion of fuel and air occurs. Each combustion chamber 104 can include a cylinder 106 in which there is reciprocally disposed a piston 108 that is movable between a top dead center (TDC) position and a bottom dead center (BDC) position. The pistons 108 are operatively linked to a crankshaft 109 that translates the linear reciprocal motion of the pistons 108 to rotational motion that can be transmitted to other applications. The internal combustion engine 100 may operate on the familiar four-stroke combustion cycle in which the pistons 108 sequential move to the BDC position during an intake stroke to draw in air; move to the TDC position to compresses the air; move back to the BDC position during the power stroke when fuel introduced to the cylinder 106 combusts with the air; and moves back to the TDC position to exhaust the combustion byproducts from the cylinder 106. However, the internal combustion engine 100 may be configured to operate on other combustion cycles.

To deliver fuel to the plurality of combustion chambers 104, the internal combustion engine 100 can be operatively associated with a fuel system 110. To store the hydrocarbon-based fuel for combustion, the fuel system 110 includes a fuel reservoir or fuel tank 112 typically located on the machine associated with the internal combustion engine 100. A fuel pump 114 can pressurize and direct fuel via fuel lines 116 from the fuel tank 112 to a plurality of fuel injectors 118 in fluid communication with respective combustion chambers 104. In diesel-burning compression ignition engines, the fuel auto-ignites upon introduction to the highly pressurized conditions in the combustion chamber 104 resulting from the compression stroke. In an embodiment, the fuel system 110 may be a dual fuel system configured to burn different fuels or different mixtures of fuels at different times for, for example, efficiency reasons or because certain fuels may combust more cleanly and reduce emissions. Accordingly, the fuel system 110 may include a second fuel tank 120 in fluid communication with the internal combustion chambers via a second fuel pump 122 and secondary fuel lines 124. The fuel in the first fuel tank 112 may be a liquid fuel such as diesel and the fuel in the second fuel tank 120 may be a natural gas such as methane or propane. The liquid and gaseous fuels may be introduced to the combustion chambers 104 using the same or different fuel injectors 118. Combustion of the different fuel may occur separately or simultaneously such as when diesel fuel is used to pilot ignite natural gas.

To deliver air for use as an oxidizer during the combustion process from the surrounding environment, which may be the atmosphere, the internal combustion engine 100 can be operatively associated with an air intake system 130. To receive air from the environment, the air intake system 130 includes an air filter 132 and an adjustable governor 134. The air filter 132 may remove contaminants, dust, and debris from the intake air and the adjustable governor 134 may be a valve such as a butterfly valve or the like that can be controlled to adjust and meter the amount of intake air introduced to the air intake system 130. An intake conduit 136, such as a pipe or a channel, extends from the adjustable governor 134 to an intake manifold 138 operatively disposed on the cylinder block 102. The intake manifold 138 can include channels or paths for directing air from the intake conduit 136 to the plurality of combustion chambers 104. To selectively establish fluid communication between the intake manifold 138 and the combustion chambers 104, the combustion chambers 104 may be associated with intake valves that can be selectively opened and closed at the desired times to receive intake air from the intake manifold 138. The intake valves may be electrically actuated or cam operated, and may be configured to implement variable valve timing.

To remove the byproducts of the combustion process from the cylinders 106, the internal combustion engine 100 can be operatively associated with an exhaust system 140. The exhaust system can include an exhaust manifold 142 that is operatively disposed on the cylinder block 102 and in fluid communication with the plurality of combustion chambers 104 via selectively actuated exhaust valves. Opening an exhaust valve as the piston 108 moves to the TDC position during the exhaust stroke forcibly discharges the contents of the cylinder 106 into the exhaust manifold 142. In an embodiment, multiple intake and exhaust valves may be associated with each combustion chamber 104. The exhaust manifold 142 also communicates with an exhaust conduit 144 that extends and ultimately directs the discharged exhaust gases to a stack 146 where they are discharged to the atmosphere.

In an embodiment, to increase the efficiency of the internal combustion engine 100, a turbocharger 150 can be operatively associated with the intake system 130 and the exhaust system 140. In particular, the turbocharger 150 can include a turbine 152 that is disposed in the exhaust conduit 144 downstream of the exhaust manifold 142 that receives pressurized exhaust gases discharged from the combustion chambers 104. The turbine 152 can include a plurality of vanes that are arranged on and disposed about a rotating hub 154. When the pressurized exhaust gases are directed through the turbine 152 past the vanes, the pressurized flow may drive the vanes thereby rotating the hub 154 The hub 154 may be directly coupled to a compressor 156 disposed in the intake conduit 136 downstream of the governor 134 through which the atmospheric air is received. The compressor 156 can have a similar arrangement of vanes on the rotating hub 154 that functions as a blower to transfer and pressurizes intake air further downstream in the intake conduit 136 and into the intake manifold 138. Because the intake air in the intake manifold 138 is pressurized, more intake air can be forced into the combustion chambers 104 and thus more fuel can be introduced and combusted per engine cycle, thereby increasing engine efficiency and/or power output. In an embodiment, because compressing the intake air via the compressor 156 may increase its temperature, a charge air cooler 158 can be disposed in the intake conduit 136 downstream of the turbocharger 150.

In an embodiment, to reduce emissions and particularly nitrogen oxides ($NO_X$) in the exhaust gases, the internal combustion engine 100 can be operatively configured with an exhaust gas recirculation (EGR) system 160 to redirect a portion of the exhaust gases from the exhaust system 140 to the intake system 130. In particular, the EGR system 160 can include an EGR conduit 162 that is in fluid communication with the exhaust conduit 144 upstream of the turbocharger 150 and can be selectively opened and closed by an EGR valve 164. The EGR conduit 162 is also in fluid communication with the intake manifold 138 through an EGR cooler 166 that can be a radiated air-cooled device. When the EGR valve 164 is opened, a portion of the exhaust gases are redirected through the EGR conduit to the EGR cooler 166 where the gas temperature is lowered, then directed to the intake manifold 138 where the gases are reintroduced to the combustion chambers 104 with fresh intake air from the intake system 130. Recirculating exhaust gases from earlier engine cycles at appropriate times during engine operation may lower combustion temperatures, which reduces $NO_X$ formation and may displace excess oxygen ($O_2$) in the fresh intake air, which further reduces $NO_X$ formation.

To further address and reduce emissions in the exhaust gases, the internal combustion engine 100 can be operatively associated with a main or primary aftertreatment system 170 including one or more aftertreatment devices disposed in the exhaust conduit 144 downstream of the engine and the turbocharger 150. The aftertreatment devices can be closely arranged and communicate with each other in a manner to cooperatively interact and react with the exhaust gases to facilitate emissions reduction. For example, to reduce carbon monoxide (CO) and hydrocarbons ($C_XH_X$) resulting from unburned fuel in the exhaust gases, a diesel oxidation catalyst (DOC) 172 can be included to initiate an oxidation reaction converting those components to carbon dioxide ($CO_2$) and water ($H_2O$). The DOC can include a honeycombed or wire mesh DOC substrate 174 of a flow-through configuration having parallel, unobstructed channels disposed through it that presents relatively minor resistance to exhaust flow. The DOC substrate 174 may be made of a precious metal like palladium or platinum formulated to cause the catalytic reaction. A secondary reaction associated with DOCs is the production of nitrogen dioxide ($NO_2$) from nitrogen oxide (NO) and oxygen ($O_2$) in the exhaust gases that requires further treatment.

To remove particulate matter and soot, a diesel particulate filter (DPF) 180 may be included downstream of the DOC and that may include a DPF substrate 182 made of cordierite, aluminum titanate, or a similar ceramic material to trap and retain the particulate matter. In contrast to the flow-through configuration of the DOC 172, the DPF 180 may be a monolithic, wall-flow construction having a plurality of parallel channels with inlets and outlets plugged in an alternating arrangement such that pressurized exhaust gases are forced to traverse the internal channel walls. The wall-flow configuration of the DPF 180 can therefore trap a larger quantity or percentage of particulate matter than a flow-through configuration. However, to periodically remove trapped particulates, the DPF will require periodic regeneration, which may be accomplished actively through use of a supplemental source of heat such as combusting additional fuel in the DPF or which may be accomplished passively under normal temperatures through chemical processes.

Disposed further downstream to abate the nitrogen oxides present in the exhaust gases, including the $NO_2$ produced by the DOC 172, the primary aftertreatment system 170 can include a main or primary selective catalytic reduction (SCR) catalyst 190. The primary SCR catalyst 190 can include a primary SCR substrate 192 of a catalytic material such as vanadium and that may also be of the opened, flow-through configuration such as honeycomb or wire mesh that presents relatively minor obstruction to flow. To introduce the reductant agent or diesel exhaust fluid (DEF) to the exhaust, a primary DEF injector 194 can be disposed upstream of the primary SCR catalyst 190. The primary DEF injector 194 can be an electromechanically operated injector configured to introduce pressurized DEF as a spray into the exhaust stream in a process sometimes referred to as dosing. The DEF itself may be retrained in a refillable DEF tank 196 or reservoir on the machine associated with the internal combustion engine 100. It is desirable to stoichmetrically balance the introduction DEF to the primary SCR catalyst 180 so that sufficient DEF is present for the reaction but so that little or no excess DEF is present to exit the primary aftertreatment system 170 unreacted, a condition referred to as ammonia slip. In an embodiment, to address excess ammonia, an ammonia oxidation catalyst (AMOX) 198 may be disposed downstream of the primary SCR catalyst 190 to catalyze ammonia ($NH_3$) and oxygen ($O_2$) to nitrogen ($N_2$) and water ($H_2O$).

Figure 2:
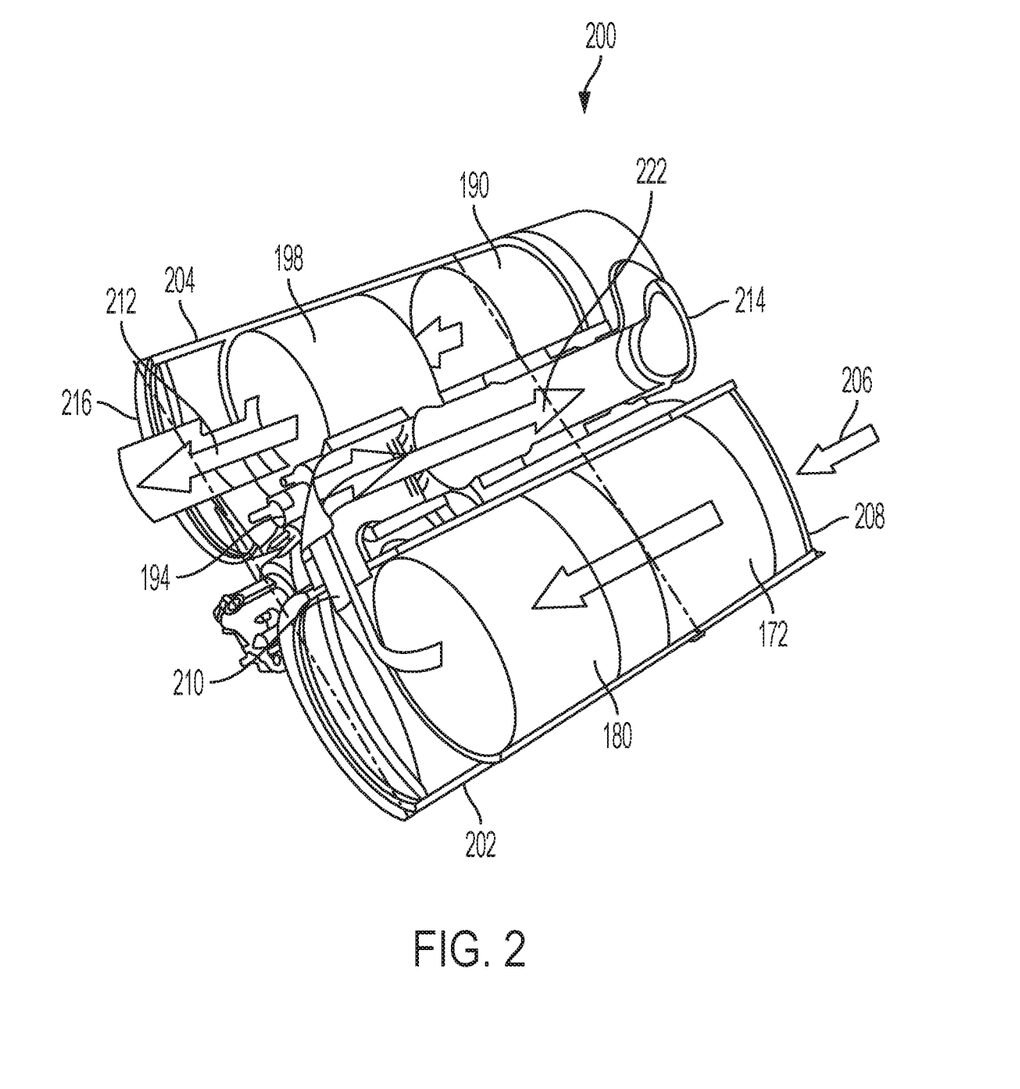
FIG. 2 is a partial sectional view of a primary exhaust aftertreatment system configured as a compact module in accordance with the disclosure.

Referring to FIG. 2, in an embodiment, to limit space and weight and to simplify installation and mounting on the internal combustion engine 100, especially when used with large-scale heavy industrial engines, the devices of the primary aftertreatment system 170 can be arranged and packaged as a compact external module 200. Packaging the primary aftertreatment system 170 as an external module 200 reduces size and weight while allowing for arrangement of the various devices and routing of the exhaust gases in a manner that increases the cooperative interaction of the system. To accommodate the aftertreatment devices, the external module 200 can include a first or upstream module housing 202 and a second or downstream module housing 204, which may both be generally cylindrical in shape and may be manufactured as metal drums or cans from, for example, stainless steel or aluminum. The cylindrical upstream module housing 202 can define a first axial flow path 206 for flow of exhaust gases between an inlet opening 208 and an exit opening 210. Likewise, the cylindrical downstream module housing 204 can define a second axial flow path 212 for the exhaust gases between an inlet opening 214 and an exit opening 216.

When assembled in the external module 200, the upstream and downstream module housing 202, 204 can be disposed parallel to each other with the first and second axial flow paths 206, 212 likewise parallel and which further may be both oriented in the same direction. To establish fluid communication between the upstream module housing 202 and the downstream module housing 204, a transfer pipe or transfer conduit 220 may be disposed there between such that exhaust gases flow from the exit opening 210 of the upstream module housing 202 to the inlet opening 214 of the downstream module housing 204. The transfer conduit 220 may be a cylindrical, elongated tube that is smaller in diameter than either the upstream module housing 202 or the downstream module housing 204. Because the upstream and downstream module housings 202, 204 are relatively coextensive to each other with the first and second axial flow paths 206, 212 oriented in the same direction, the transfer conduit 220 needs to reverse and redirect the flow of exhaust gases. In particular, the transfer conduit 220 may establish a third axial flow path 222 parallel to and in the opposite direction of the first and second axial flow paths 206, 212.

The devices of the primary aftertreatment system 170 can be arranged in series in the upstream and downstream module housings 202, 204 of the external module 200 to advantageously stage the different reactions with the exhaust gases. In particular, the DOC 172 can be disposed in the upstream module housing 202 proximate the inlet opening 208 and the DPF 180 can be disposed axially rearward of the DOC 172 proximate the exit opening 210. Accordingly, exhaust gases flow across the DOC 172 and DPF 180 along the first axial flow path 206, then must be redirected into the transfer conduit 220 and redirected 180° to flow with respect to the third axial flow path 222. In an embodiment, the primary DEF injector 194 can be in fluid communication with the transfer conduit 220 to introduce DEF to the exhaust gases such that the two fluids have the opportunity to mix along the third axial flow path 222. At the inlet opening 214 into the second module housing 204, the exhaust gases are redirect again 180° from the third axial flow path 222 to the second axial flow path 212 and enter the primary SCR catalyst 190 where, in the presence of DEF, the reduction of nitrogen oxides ($NO_X$) to nitrogen ($N_2$) and water ($H_2O$) can occur. The treated exhaust gases exit the compact module 200 through the exit opening 216 of the downstream module housing 204 where the AMOX catalyst 198 is located to reduce ammonia slip. While the foregoing is an exemplary arrangement of the components of the primary aftertreatment system 170, it will be appreciated that other arrangements are possible and contemplated.

The selective catalytic reaction conducted by the primary SCR catalyst 190 is dependent upon several variables that frequently change with the operating state of the internal combustion engine, including temperature of the exhaust gases and the catalyst. For example, the SCR reaction may require that the primary SCR catalyst 190 attain temperatures of 200° C. or more, possible 225° C. or more before significant reduction of $NO_X$ in the presence of DEF occurs. Because the primary SCR catalyst 190 may be located a significant distance from the exhaust manifold 142 on the internal combustion engine 100 and may be downstream of other aftertreatment devices including the DOC 172 and the DPF 180, the primary SCR catalyst may not reach or maintain sufficient temperatures, especially during start up or low-load conditions of the engine such as when idling. Reaching or maintaining temperatures necessary for the SCR reaction may be further impeded in embodiment where the primary SCR catalyst 190 is disposed in the downstream housing 204 of a compact module 200, where it is further removed from the internal combustion engine 100. Accordingly, in an embodiment illustrated in FIG. 1, a close-coupled SCR catalyst 230 can be disposed in the exhaust conduit 144 sufficiently upstream of the primary aftertreatment system 170 and in a close-coupled relation to the internal combustion engine 100 to receive high temperature raw exhaust gases.

For example, the close-coupled SCR catalyst 230 can be a standalone device disposed immediately downstream of the turbine 152 of the turbocharger 150 without any intervening aftertreatment components there between. In particular, the close-coupled SCR catalyst 230 may be immediately proximate to the exit of the turbine 152 that directs the hot exhaust gases directly therein from the combustion chambers 104 of the internal combustion engine 100. In other embodiments, the close-coupled SCR catalyst may be coupled directly to the exhaust manifold 142. As used herein, the term "close-coupled" means the absence of intervening components affecting exhaust composition, namely, $NO_X$, unburned hydrocarbons or HC, particulate matter, or other exhaust constituents. "Raw exhaust gases" are those that have not been treated by other aftertreatment devices to affect the compositional constituents. Hence, the close-coupled SCR catalyst 230 can be rapidly heat to the required temperatures to initiate the SCR reaction well before the primary SCR catalyst 190 downstream.

In an embodiment described in more detail below, operation of the close-coupled SCR catalyst 230 may be regulated so that the SCR reaction therein occurs during low-load conditions or low power output conditions of the internal combustion engine 100 when exhaust temperatures and/or exhaust flowrate may be reduced compared to loaded or peak power conditions. The close-coupled SCR catalyst 230 can include a SCR substrate 232 of the flow-through configuration such as honeycomb that may be coated or treated with material to initiate the SCR catalytic reaction. In an embodiment, the material of the close-coupled SCR catalyst 230 may be different from the primary SCR catalyst 190 and may include, for example, copper-zeolite and/or iron-zeolite. A possible advantage of such alternative materials is that they may initiate the SCR reaction at lower temperatures than materials selected for the primary SCR catalyst 190. Moreover, because the close-coupled SCR catalyst 230 may only be operational during low-load or low power output conditions with reduced exhaust temperature and/or flow, the relative size of the close-coupled SCR catalyst 230 in comparison to the primary SCR catalyst 190 may be reduced to heat the close-coupled SCR catalyst to activation temperatures more quickly.

To provide DEF for the SCR reaction in the close-coupled SCR catalyst 230, an upstream DEF injector 234 can be disposed in a position operationally upstream of the internal combustion engine 100 to introduce DEF to the combustion chambers 104. To receive DEF fluid, the upstream DEF injectors 234 can be in fluid communication with the DEF tank 196 via an upstream DEF line 236 that may include an upstream pump 238 to pressurize the liquid DEF. The DEF may be anhydrous ammonia or may be aqueous ammonia with a mixture of approximately one third ammonia and two thirds water. In various embodiments, the upstream DEF injector 234 can be located to introduce DEF to the intake system 130 or directly to the combustion chambers 104. Hence, the DEF is introduced to the upstream or inlet side of the internal combustion engine 100 and may, in an embodiment, undergo or be present during the combustion process in the combustion chambers 104. The DEF is thus present in the exhaust gases expelled from the combustion chambers 104 to the exhaust manifold 142 and are direct directed by the exhaust conduit 144 to the close-coupled SCR catalyst 230. Because the DEF is present in the combustion chamber 104 and can receive the heat of combustion released therein, the combustion process may evaporate or vaporize the DEF to ensure it is entrained in the exhaust gases for the SCR reaction.

In the embodiment illustrated in FIG. 1, the upstream DEF injectors 234 may be combined with the fuel injectors 118 directly communicating with the plurality of combustion chambers 104. For example, the fuel/DEF injectors 118, 234 may be dual nozzle or twin injector configured with two fluid paths each terminating in an orifice to introduce two different fluids. Accordingly, the upstream DEF line 236 can extend to and terminate at the plurality of fuel/DEF injectors 118, 234. In another embodiment, the DEF may be emulsified with the fuel introduced so that the two fluids can be introduced together to the chambers during combustion. The fuel line 116 from the first fuel reservoir 112 and the upstream DEF line 236 from the DEF reservoir 196 can merge upstream of the fuel/DEF injectors 118, 234 so that the fluids mix to form an emulsion or mixture prior to injection into the combustion chambers 104. Suitable pipe connectors, mixers and the like can be included to facilitate emulsification of the fuel and DEF. Further, in the embodiments where the fuel system 110 is a dual fuel system, the upstream DEF line 236 may join with both the first fuel line 116 and second fuel line 124 so that the DEF may emulsify or mix with the first and second fuels. Accordingly, a common injector 118, 234 can be used to introduce all three fluids directly into the combustion chamber 104 and the first and second fuel pumps 114, 122 and the upstream DEF pump 238 can be selectively activated to adjust the relative ratio of the first and second fuels and the DEF.

Figure 3:
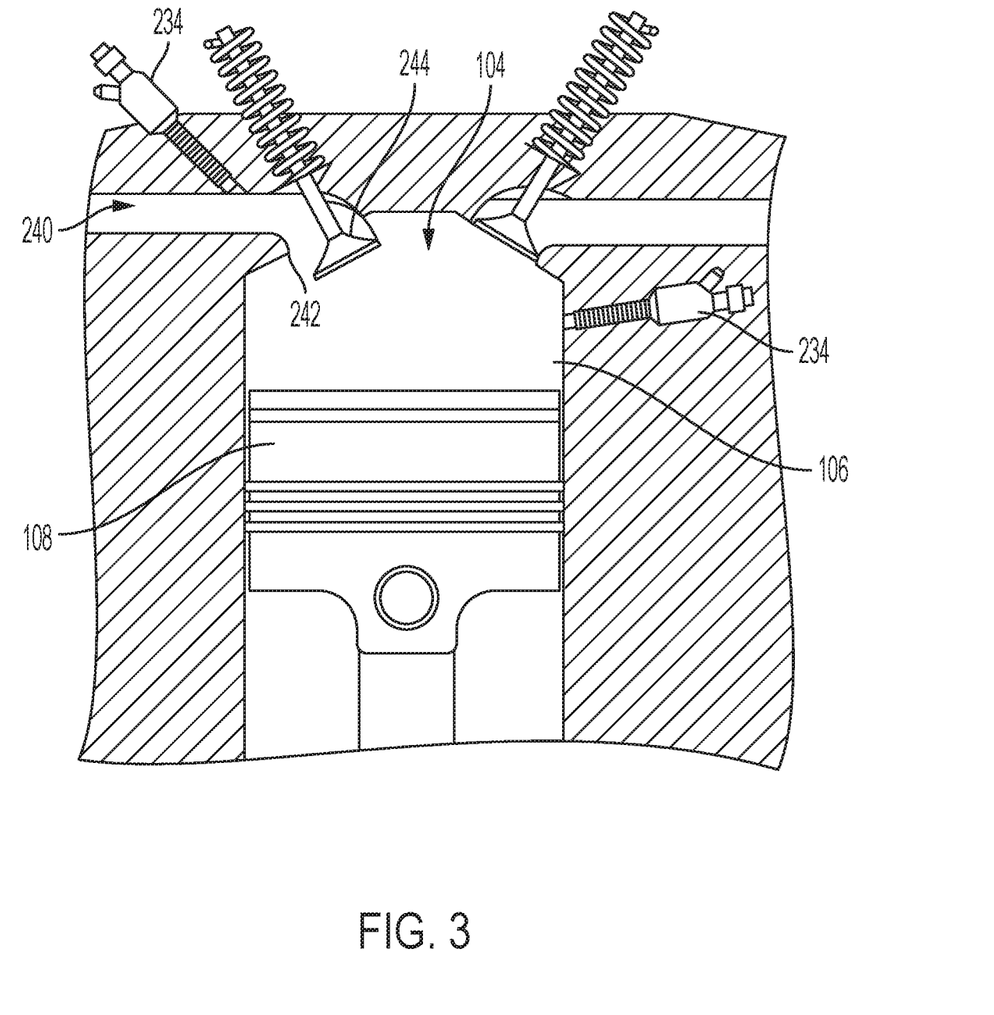
FIG. 3 is a sectional diagrammatic view of a combustion chamber of the internal combustion engine illustrating possible arrangements of components for the introduction of DEF to the combustion chamber.

However, in other embodiments, the upstream DEF injectors 234 can be distinct injectors and located elsewhere. Referring to FIG. 3, for example, the upstream DEF injectors 234 may be direct injectors and may be disposed into the wall of the cylinder 106 to directly introduce DEF into the combustion chamber 104. The timing of the direct injection may be such that DEF is present before or after the spontaneous combustion event and may occur before, during, or after the power stroke of the piston 108. In other examples, the upstream DEF injectors 234 may be port injectors and may be disposed upstream of the cylinder 106, for example, in an intake runner 240 and oriented toward the intake port 242 that is selectively opened by the intake valve 244. Accordingly, DEF should be introduced during the intake stroke of the piston 108 before combustion. Impingement of the DEF on the intake valve 242 may assist in dispersing the DEF with the intake air. In other embodiments, the upstream DEF injector 234 can be located further upstream in the intake manifold 138 such that a single injector can introduce DEF to the plurality of combustion chambers 104 in the engine block 102.

Referring back to FIG. 1, to monitor and regulate operation of the internal combustion engine 100 and to selectively switch between operating the primary SCR catalyst 190 and the close-coupled SCR catalyst 230 during loaded and low-load conditions, the internal combustion engine 100 may be operatively associated with an electronic controller 250, also referred to as an electronic control unit (ECU), or as an engine control module (ECM), or possibly just controller, and that may be disposed onboard the machine that the engine powers. The electronic controller 250 can be a programmable computing device and can include one or more microprocessors 252, non-transitory computer readable and/or writeable memory 254 or a similar storage medium, input/output interfaces 256, and other appropriate circuitry for processing computer executable instructions, programs, applications, and data to regulate performance of the engine 100. The electronic controller 250 may be configured to process digital data in the form of binary bits and bytes. The electronic controller 250 can communicate with various sensors to receive data about engine performance and operating characteristics and can responsively control various actuators to adjust that performance.

To send and receive electronic signals to input data and output commands, the electronic controller 250 can be operatively associated with a communication network having a plurality of terminal nodes connected by data links or communication channels. For example, as will be familiar to those of skill in the art of automotive technologies, a controller area network ("CAN") can be utilized that is a standardized communication bus including physical communication channels conducting signals conveying information between the electronic controller 250 and the sensors and actuators. However, in possible embodiments, the electronic controller 250 may utilize other forms of data communication such as radio frequency waves like Wi-Fi, optical wave guides and fiber optics, or other technologies. In an embodiment, the electronic controller 250 may be a preprogrammed, dedicated device like an application specific integrated circuit (ASIC) or field programmable gate array (FPGA). To possibly interface with an operator or technician, the electronic controller 250 can be operatively associated with an operator interface display that may be referred to as a human-machine interface (HMI).

To regulate operation of the primary aftertreatment system 170 and the close-coupled SCR catalyst 190, the electronic controller 250 can electronically communicate with sensors, actuators, and regulators as indicated in FIG. 1 by dashed lines. For example, to measure and determine the temperature of hot exhaust gases exiting the turbine 152, a raw exhaust sensor 260 can be disposed in fluid communication with the exhaust conduit 144 at the exit of the turbine 152 and upstream of the close-coupled SCR catalyst 190. The raw exhaust sensor 260 can therefore measure the temperature and other qualities of the raw exhaust gases prior to any aftertreatment processing. The raw exhaust sensor 260 can be a thermocouple, an infrared sensor, or operate on other suitable temperatures sensing parameters and may measure other parameters such as the $NO_X$ content or concentration in the raw exhaust gases. In an embodiment, the raw exhaust sensor 260 may be configured to measure $NO_X$ content or concentration of the raw exhaust gases. To measure and determine the temperature of the primary SCR catalyst 190 and/or $NO_X$ content thereat, the electronic controller 250 can be in electronic communication with a primary SCR sensor 262 disposed in or operatively associated with the primary SCR catalyst 190. In possible embodiments, the primary SCR sensor 262 may be a virtual sensor that indirectly measures $NO_X$ concentration based on other parameters associated with the exhaust gases or engine operation.

To determine if the internal combustion engine 100 is operating under running conditions or under low-load or lower power conditions, the electronic controller 250 can be operatively associated with one or more sensors operatively disposed and configured to directly or indirectly determine such conditions. For example, engine load and/or power output may be indirectly measured by the mass airflow rate or the quantity of intake airflow to the plurality of combustion chambers 104. The ratio of the current airflow drawn by the internal combustion engine to airflow under peak operating conditions, as predetermined empirically or as derived from manufacturer specifications, indicates the amount of work the engine is undertaking, which in turn indicates the relative load on or power output of the engine. To measure mass airflow rate, the electronic controller 250 can communicate with a mass airflow sensor 264 disposed in the intake conduit 136 downstream of the governor 134. The mass airflow sensor 264 may be a hotwire sensor in which an electrically heated wire is disposed in the intake airflow and the resultant cooling effect indicates the quantity of intake air drawn through the intake system 130 by the internal combustion engine 100.

To more directly measure engine load or power, the electronic controller 250 can be in communication with one or more in-cylinder sensors 266 configured to directly measure an in-cylinder parameter such as, for example, in-cylinder pressure sensors that are partially disposed in the combustion chambers 104 to measure pressure conditions in the cylinders 106. In an embodiment, the in-cylinder sensors 266 can measure the mean effective pressure acting on the pistons 108 in the cylinders 106 during the engine cycle. The mean effective pressure in the combustion chambers 104 can be converted to torque in the crankshaft 109 and is useful in measuring engine power output instantaneously or over unit time. Although FIG. 1 illustrates a single in-cylinder pressure sensor 166, sensors may be included for each combustion chamber 104. To measure the actual speed of the internal combustion engine 100, the electronic controller 250 can communicate with an engine speed sensor 268 configured to measure the rotation rate of the crankshaft 109 in revolutions per minute (RPM). The engine speed sensor 268 may operate on optical or direct contact techniques. Sensors for measuring additional variable and parameters relevant to engine load or power output, like air temperature, fuel temperature, and the like, may also be included. In addition to the foregoing, the electronic controller 250 can be operatively associated with the primary DEF injector 194 and with the upstream DEF injectors 234 to selectively actuate either or both to introduce DEF.

INDUSTRIAL APPLICABILITY

Figure 4:
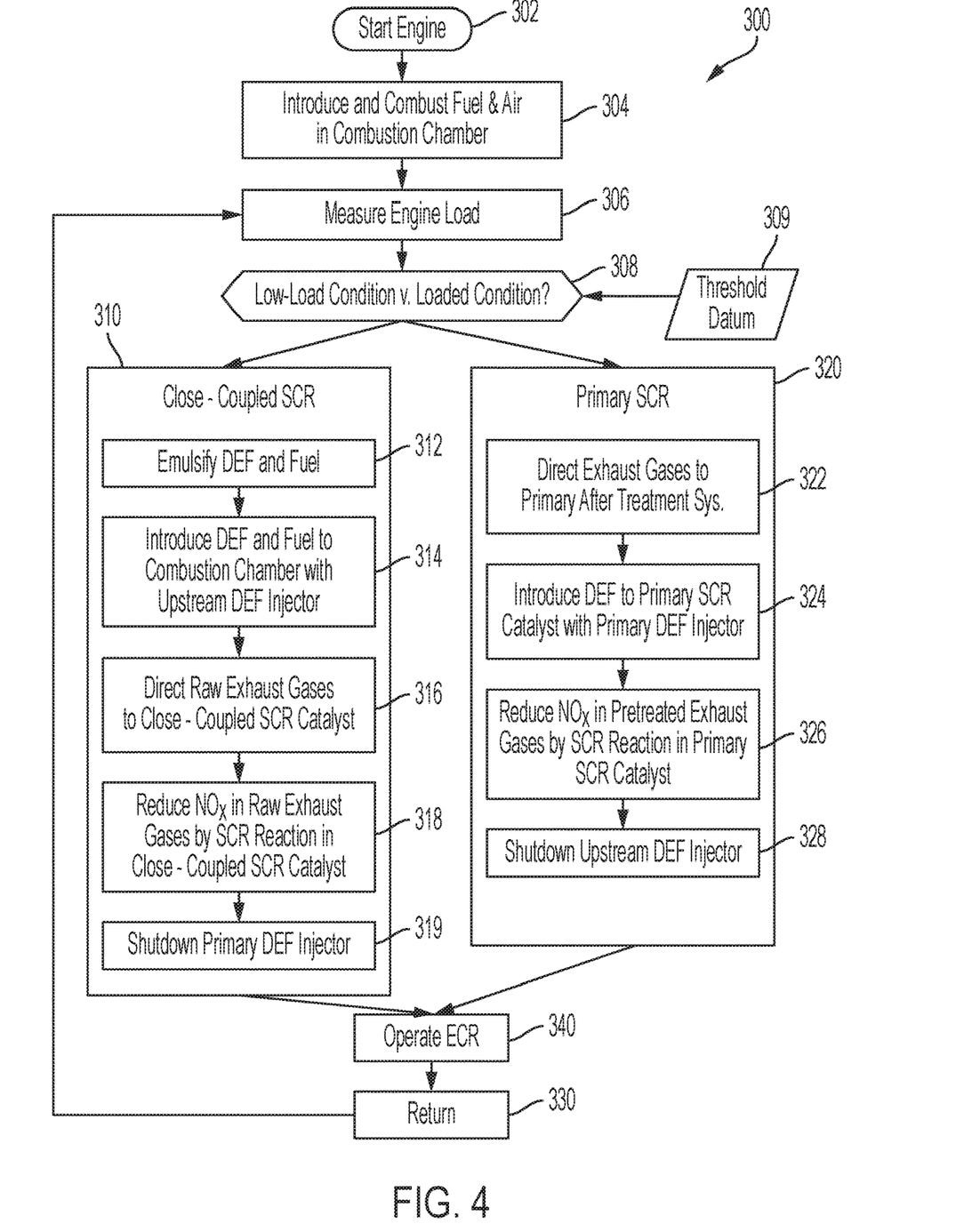
FIG. 4 is a flow diagram illustrating an example of a computer implement process, routine, or algorithm for regulating the treatment of exhaust gases from an internal combustion engine during low load and loaded conditions of the engine.

Referring to FIG. 4, in conjunction with FIG. 1, there is illustrated a flow diagram 300 of an exemplary routine or algorithm for the disclosed aftertreatment process. The flow diagram 300 can include a series of steps, including actions and decisions, that can be implemented as computer-executable software instructions or code in the form of an application or program that can be executed by the one or more processors 252 associated with the electronic controller 250. Further, the flow diagram 300 in software form may be stored in a non-transitory state in the memory 244 associated with the electronic controller 250. The flow diagram 300 may begin by initially starting the internal combustion engine 100 in a start step 302, which may include cold starting and/or staring in a cold ambient environment.

With the internal combustion engine 100 running, fuel and air as an oxidizer are introduced to the combustion chambers 104 and combusted in a combustion step 304. It can be appreciated that the combustion step 304 is ongoing in duration and may continue while power is required from the internal combustion engine 100. In addition, in the dual fuel embodiments of the fuel system 110, the combustion step may involve combustion of first and/or second fuels as appropriate. In a measurement step 306, the engine load applied or power output resulting from the combustion step 304 may be measured by the electronic controller 250. The measurement step 306 may utilize any suitable method to measure or estimate engine load or power output including, for example, utilizing intake airflow as determined from the mass airflow sensor 264 or utilizing mean effective pressure as determined from the in-cylinder parameter sensor 266. Moreover, the measurement step 306 can measure engine load or power output in any suitable units, including the relative ratio of current engine load to peak engine load for engine load or horsepower for power output.

In a comparison or query step 308, the electronic controller 250 can analyze the output of the measurement step 306 to determine if the internal combustion engine is operating in a low-load condition compared to a loaded condition or a low-power condition compared to powered condition. In the low-load or low-power condition, as may occur when the internal combustion engine 100 is idle or not doing work, the heat output and exhaust flow may be reduce compared to the temperature and exhaust flowrates when the engine is loaded or generating operating power (i.e. the engine is doing work to drive a load). Accordingly, the internal combustion engine 100 discharges insufficient energy to heat and maintain the primary SCR catalyst 190 at temperatures sufficiently high to sustain the SCR reaction. To perform the query step 308, the electronic controller 250 can use a threshold datum 309 that can be compared to the measured output from the measurement step 306. The threshold datum 309 can, for example, be a threshold ratio of current-to-peak load or current-to-peak power, or can be another value useful in determining the current operation or performance of the internal combustion engine 100. The threshold datum 309 can be determined theoretically by design or empirically. Below the threshold datum 309, the engine can be considered as not doing operative work. The threshold datum 309 may be stored as electronic data in the memory 254 of the electronic controller 250.

If the query step 308 determines the internal combustion engine 100 is operating at low-load or low-power conditions, the flow diagram 300 can proceed to a subroutine 310 to utilize the close-coupled SCR catalyst 230 to reduce $NO_X$ in the exhaust gases. To utilize the close-coupled SCR catalyst 230, in an embodiment, both DEF and fuel can be directed to the upstream fuel/DEF injector 118, 234 for introduction to the combustion chamber 104 during the combustion event. In a possible embodiment, the DEF and fuel can be mixed together in an emulsification step 312 and, in a subsequent injection step 314, the DEF and fuel can be directly introduced to the combustion chamber 104 by the common upstream injector 234. However, in other embodiments, DEF and fuel can be introduced to the combustion chamber 104 separately using different injectors. The low-load or low-power conditions may advantageously be such that combustion will not substantially oxidize the DEF. In other words, because the internal combustion engine 100 is not doing significant work, the combustion temperatures in the combustion chambers 104 may be relatively low compared to the loaded or operating conditions. Moreover, when DEF is present in the combustion chamber 104 during combustion, a portion of the heat release may be consumed to evaporate or vaporize the DEF, especially when in the form of aqueous ammonia, thereby reducing the temperature rise in the combustion chamber 104. Because $NO_X$ formation from nitrogen (N) and oxygen ($O_2$) increase with temperature, the evaporative cooling effect may advantageously reduce $NO_X$ formation in the combustion chamber 104.

In an exhaust direction step 316, the raw exhaust gases that are byproducts of the combustion process are directed from the exhaust manifold 142 to the close-coupled SCR catalyst 230 in the exhaust conduit 144 that may be immediately downstream of the turbine 152. The temperature of the raw exhaust gases are still sufficiently elevated to heat the close-coupled SCR catalyst 230 to reaction temperatures such that a close-coupled SCR reaction step 318 occurs to reduce $NO_X$ in the close-coupled SCR catalyst 230. The material and size of the close-coupled SCR catalyst 230 may further be selected to encourage rapid heating and maintain the reaction during low-load or low power conditions. To avoid ammonia slip from the primary SCR catalyst 190, the flow diagram 300 may include a shutdown step 319 in which the electronic controller 250 confirms that the primary DEF injector 194 is not actively dosing or introducing DEF to the primary SCR catalyst 190.

If the query step 308 instead determines the internal combustion engine 100 is operating at loaded conditions or generating significant power output, the flow diagram 300 can proceed to a subroutine 320 to utilize the primary SCR catalyst 190 to reduce $NO_X$. In particular, in an exhaust direction step 322, the exhaust gases are directed from the exhaust manifold 142 through the close-coupled SCR catalyst 230 to the primary aftertreatment system 170 further downstream. Because the primary SCR catalyst 190 may be disposed in the compact module with other aftertreatment components like the DOC 172 and DPF 180, the exhaust gases may preliminary modified before entering the primary SCR catalyst 190. Moreover, the exhaust gases discharged during loaded or operating conditions can be significantly elevated in temperature to heat the primary SCR catalyst 190 to the necessary reaction temperatures. In an injection step 324, the electronic controller 250 may activate the primary DEF injector 194 to introduce DEF to the primary SCR catalyst 190. Thus, a primary SCR reaction step 326 can occur to reduce $NO_X$ in the primary SCR catalyst 190. The primary SCR catalyst 190 may be made of materials and significantly sized to advantageously reduce $NO_X$ in the quantities produced by the internal combustion engine 100 during loaded conditions or during significant power output. For example, the primary SCR catalyst 190 may be a high efficiency, high volume catalyst to conduct the reaction process for extended periods. To preserve DEF that would otherwise be oxidized at the elevated combustion temperatures prevailing in the combustion chambers 104 under such conditions, the flow diagram 300 can include a shutdown step 328 in which the electronic controller 250 verifies that the upstream DEF injectors 234 are no longer introducing DEF to the combustion chambers 104.

Either subroutine 310, 320 may be followed by a return step 330 by which the flow diagram 300 returns to the load measurement step 306 to continuously measure the load condition or power output of the internal combustion engine. Accordingly, if the operating conditions of the engine change, the flow diagram 300 as implemented by the electronic controller 250 can selectively switch between the subroutines 310, 320 to direct that the SCR reaction occur in either the primary or close-coupled SCR catalysts 190, 230 as is best suited for the current conditions. In a possible variation, during startup mode, the flow diagram 300 may conduct an EGR step 340 in which the EGR valve 164 is opened during either the low-load or loaded conditions to recirculate exhaust gases to the intake system 130, further reducing $NO_X$ production during the combustion cycle.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A machine comprising:
an internal combustion engine including a combustion chamber;
an air intake system upstream of the internal combustion engine to direct intake air to the combustion chamber;
an exhaust system downstream of the internal combustion engine to direct exhaust gases from the combustion chamber;
an upstream diesel exhaust fluid (DEF) injector disposed to selectively introduce DEF to the combustion chamber;
a close-coupled selective catalytic reduction (SCR) catalyst disposed in the exhaust system in a close-coupled relation to the internal combustion engine to receive raw exhaust gases therefrom and to reduce nitrogen oxides ($NO_X$) to nitrogen ($N_2$) and water ($H_2O$) during a low-load condition of the internal combustion engine
a primary SCR catalyst and a primary DEF injector downstream of the close-coupled SCR catalyst, the primary DEF injector disposed to introduce DEF to the exhaust gases, the primary DEF injector selectively activated to reduce $NO_X$ to $N_2$ and $H_2O$ in the primary SCR catalyst during a loaded condition of the internal combustion engine.

2. The machine of claim 1, further comprising an electronic controller in electrical communication with the upstream DEF injector and the primary DEF injector, the electronic controller configured to switch between introducing DEF through the upstream DEF injector during the low-load condition and introducing DEF through the primary DEF injector during the loaded condition.

3. The machine of claim 2, wherein the electronic controller is configured to measure one or more of engine load and power output to assess between the low-load condition and the loaded condition of the internal combustion engine.

4. The machine of claim 3, further comprising a mass airflow sensor operatively associated with the air intake system to measure mass airflow rate; and the electronic controller uses mass airflow rate to assess between the low-load condition and the loaded condition.

5. The machine of claim 3, further comprising an in-cylinder parameter sensor operatively associated with the combustion chamber to measure mean effective pressure;

and the electronic controller uses mean effective pressure to assess between the low-load condition and the loaded condition.

6. The machine of claim 1, further comprising a turbocharger including a compressor in fluid communication with the air intake system and a turbine in fluid communication with the exhaust system.

7. The machine of claim 6, wherein the close-coupled SCR catalyst is directly connected to an exit of the turbine.

8. The machine of claim 7, wherein the primary aftertreatment system includes, upstream of the primary SCR catalyst,
a diesel oxidation catalyst (DOC) receiving exhaust gases and operatively configured to oxidize carbon monoxide (CO) and hydrocarbons ($C_XH_X$) in the exhaust gases to carbon dioxide ($CO_2$) and water ($H_2O$); and
a diesel particulate filter (DPF) disposed downstream of the DOC to receive exhaust gases and operatively configured to trap particulate matter from the exhaust gases.

9. The machine of claim 1, wherein the upstream DEF injector is a twin nozzle injector configured to inject DEF and fuel.

10. The machine of claim 9, further comprising a dual fuel system including:
a first fuel delivery system communicating with the fuel injector to deliver DEF and a first fuel to the combustion chamber; and
a second fuel delivery system communicating with the fuel injector to deliver DEF and a second fuel to the combustion chamber.

11. The machine of claim 1, wherein the upstream DEF injector is a port injector configured to introduce DEF through an intake port communicating with the combustion chamber.

12. The machine of claim 1, wherein the DEF is aqueous ammonia formulated to vaporize and/or evaporate in the combustion chamber.

13. A method of treating exhaust gases from an internal combustion engine comprising:
introducing diesel exhaust fluid (DEF) via an upstream DEF injector to a combustion chamber of an internal combustion engine during a low-load condition of the engine;
directing raw exhaust gases including the DEF from the combustion chamber to a close-coupled selective catalyst reduction (SCR) catalyst to reduce nitrogen oxides ($NO_X$) to nitrogen ($N_2$) and water ($H_2O$) during a low-load condition of the internal combustion engine;
directing the exhaust gases from the close-coupled SCR catalyst to a primary aftertreatment system including a primary SCR injector and a primary SCR catalyst downstream of the close-coupled SCR catalyst; and
introducing DEF via a primary DEF injector to the primary SCR catalyst during a loaded condition of the internal combustion engine to reduce $NO_X$ to $N_2$ and $H_2O$ during the loaded condition.

14. The method of claim 13, comprising shutting down introduction of DEF via the upstream DEF injector during the loaded condition.

15. The method of claim 14, further comprising measuring one or more of mass airflow rate, mean effective pressure in the combustion chamber, and engine speed of the internal combustion engine to assess between the low-load condition and the loaded condition.

16. The method of claim 15, further comprising:
oxidizing carbon monoxide (CO) and hydrocarbons ($C_XH_X$) in the exhaust gases to carbon dioxide ($CO_2$) and water ($H_2O$) upstream of the primary SCR catalyst; and
trapping particulate matter in the exhaust gases upstream of the primary SCR catalyst.

17. The method of claim 16, further comprising introducing fuel to the combustion chamber via the upstream DEF injector.

18. The method of claim 13, further comprising lowering combustion temperatures by vaporizing and/or evaporating DEF in the combustion chamber.

19. A system for controlling selective catalytic reduction of exhaust gases from an internal combustion engine comprising:
an upstream diesel exhaust fluid (DEF) injector disposed upstream of the internal combustion engine to selectively introduce DEF to a combustion chamber of an internal combustion engine;
a close-coupled selective catalytic reduction (SCR) catalyst disposed downstream of and in a close-coupled relation to the internal combustion engine;
a primary SCR catalyst disposed downstream of the close-coupled SCR catalyst;
a primary DEF injector disposed downstream of the close-coupled SCR catalyst to selectively introduce DEF to the primary SCR catalyst; and
an electronic controller configured to measure an engine load applied to the internal combustion engine, to assess whether the engine load indicates a low-load condition or a loaded condition, and to activate the upstream DEF injector in the event of a low-load condition or activate the primary DEF injector in the event of a loaded condition.

* * * * *